(12) United States Patent
Wagner

(10) Patent No.: US 7,232,177 B2
(45) Date of Patent: Jun. 19, 2007

(54) ARRANGEMENT FOR SWIVELING THE PARTS OF A CONVERTIBLE TOP OF A VEHICLE

(75) Inventor: Tobias Wagner, Hamburg (DE)

(73) Assignee: Rausch & Pausch GmbH, Selb (DE)

( * ) Notice: Subject to any disclaimer, the term of this patent is extended or adjusted under 35 U.S.C. 154(b) by 0 days.

(21) Appl. No.: 11/347,702

(22) Filed: Feb. 2, 2006

(65) Prior Publication Data
US 2006/0170240 A1 Aug. 3, 2006

(30) Foreign Application Priority Data
Feb. 2, 2005 (DE) ............... 10 2005 005 237

(51) Int. Cl.
B60J 7/00 (2006.01)
(52) U.S. Cl. .................. 296/107.17; 296/108
(58) Field of Classification Search ........... 296/107.17, 296/108
See application file for complete search history.

(56) References Cited

U.S. PATENT DOCUMENTS

| 5,785,375 | A | 7/1998 | Alexander et al. | |
| 6,454,343 | B1 * | 9/2002 | Wagner et al. | 296/107.08 |
| 6,464,284 | B2 * | 10/2002 | Neubrand | 296/108 |
| 6,505,881 | B2 * | 1/2003 | Kinnanen | 296/107.17 |
| 6,508,502 | B2 * | 1/2003 | Willard | 296/107.07 |
| 6,629,719 | B2 * | 10/2003 | Sims | 296/107.08 |
| 6,722,724 | B1 * | 4/2004 | MacFarland | 296/107.17 |
| 6,820,917 | B2 * | 11/2004 | Grubbs | 296/107.17 |
| 6,866,325 | B2 * | 3/2005 | Willard | 296/107.17 |
| 6,923,491 | B2 | 8/2005 | Hahn | |
| 7,163,255 | B2 * | 1/2007 | Rawlings et al. | 296/107.08 |
| 2006/0279104 | A1 * | 12/2006 | Eichholz et al. | 296/108 |

FOREIGN PATENT DOCUMENTS

| DE | 885 356 | 7/1949 |
| DE | 40 26 392 | 2/1992 |
| DE | 101 58 938 | 6/2003 |
| DE | 101 63 727 | 7/2003 |
| DE | 102 16 417 | 10/2003 |
| DE | 103 07 844 | 9/2004 |
| DE | 103 13 496 | 10/2004 |
| EP | 0 844 125 | 5/1998 |
| EP | 1 160 113 | 12/2001 |

* cited by examiner

Primary Examiner—Kiran B. Patel
(74) Attorney, Agent, or Firm—Jordan and Hamburg LLP

(57) ABSTRACT

The invention relates to an arrangement for swiveling the parts of a convertible vehicle top, which consists at least of two cinematically linked parts, between a locked position and a put-down position and vice versa. To simplify the arrangement and to make it more effective, an intermediate bearing is carried at the body in such a way that it can be swiveled and it is coupled at one side to the body via a flexibly actuated connection element and at the other side it is coupled to one of the swiveling parts of the convertible top of the vehicle. A drive unit is provided at the intermediate bearing for swiveling the convertible top parts. At the body, a fixed control stop is positioned for a stop element that is mounted at the swiveling part of the convertible top that is coupled to the intermediate bearing.

10 Claims, 7 Drawing Sheets

ARRANGEMENT FOR SWIVELING THE PARTS OF A CONVERTIBLE TOP OF A VEHICLE

BACKGROUND OF THE INVENTION

The invention relates to an arrangement for swiveling the parts of a convertible top of a vehicle, which consists at least of two cinematically linked parts, and is in particularly destined for two-part and three-part so called hard tops of convertible cars.

So called retractable hard top convertible cars are known that require a relatively large space for the swivel motion of the rear top part exactly in the area in which parts of the body and/or tank filler inlets are located, in particular in vehicles produced according to the platform principle. For this reason, considerable and expensive changes are required at the body assembly for the convertible version of vehicles constructed according to the platform principle. Moreover, the large space required for the movement of the convertible top is not at its end positions and therefore used only during a relatively short time. A solution already known bypasses the area used for a short time by a mechanic system that swivels the rear top part first around a center of motion at a very high location before moving it into the put-down position around a center of motion that is located more in the front. For the put-down motion a second drive is required.

The DE 101 63 727 B4 describes a swivel motion of the top parts in two steps. For this movement a drive cylinder is attached with one of its coupling points or centers of motion at the body and therefore it needs a relatively long length. Moreover, this solution is restricted to specific drive units. The use of a swivel motor is not possible or only with considerable adjustment measures.

The EP 1 160 113 A2 depicts an actuating arrangement for swiveling parts of convertible vehicle tops in which a turntable drive is integrated into the body-mounted main bearings of the swiveling parts in such a way that a convertible top bow or a tonneau cover is actuated by the shaft of the turntable drive. This solution suited for simple convertible car designs is hardly applicable for retractable hard tops and moreover it requires much effort during mounting and repair works.

Furthermore, DE 885 356 describes a convertible vehicle top that includes a drive motor within the joint between the roof frame and the rear frame. In a closed motion course the drive motor participates in all movements. Thus, the clearance required for the movement of the top elements and their drive units is relatively big. Additionally, the energy supply lines to the drive motor have a complex design and are subject to considerable stresses.

SUMMARY OF THE INVENTION

Therefore, the task of the invention is to develop a swiveling arrangement for the parts of a convertible top of a vehicle, in particular for a retractable hard top, which requires considerably less clearance in the critical areas of a vehicle. It is not only intended to make an additional drive superfluous but also to avoid the restriction to a defined type of drive.

BRIEF DESCRIPTION OF THE INVENTION

An important aspect of this invention is the fact that the drive unit (the drive cylinder or the swivel motor) is not directly mounted at the body but via an intermediate bearing. Said intermediate bearing is mounted at the body in such a way that it can swivel in a plane that is mainly parallel to the axis of the vehicle. A rear top part is hinged with the intermediate bearing and both can move around a rotation axis that is in a mainly rectangular orientation to the plane just mentioned.

The rear top part is provided with a guide element (a guide pin or a guide roll) that interacts with a control stop (for example a coupling jaw) being mounted at the body (at the main bearing). Moreover, a suited connection actuated by an elastic element is provided between the main bearing and the side of the intermediate bearing that is opposite to the guide element. The flexibly actuated connection can be achieved by a spring (a compression, tension, torsion or rubber spring). This principal arrangement allows a two-phase or a split sequence of motions to move the top parts from their locking position into the put-down position and vice versa by means of only one motor that can have a variable design.

In one phase, the top parts are moved, but the position of the drive unit does not change. In the other phase, the drive unit is moved together with the top parts as long as the guide element is in contact with the control stop. The phase of the two that is the first one to be conducted depends on the wish to open or close the top.

The arrangement is designed in such a way that the rear top part rotates around two swivel axes. Thus, the necessary swivel clearance below the so called C-pillar corresponds very exactly to the space requirements of the top put down; an additional space for the motion is not required. The mechanical construction allows almost any swivel angles for the rear top parts and is not restricted to specific drive units. The latter can be hydraulic cylinders as well as swivel motors or electric motors for example, possibly with transmission gears. A usual auxiliary loading position of the swiveling top system is advantageous and possible without extra efforts.

BRIEF DESCRIPTION OF THE DRAWINGS

In the following, three examples shown in five different functional positions in front view each explain the invention in detail. They show.

DETAILED DESCRIPTION

Figure 1:
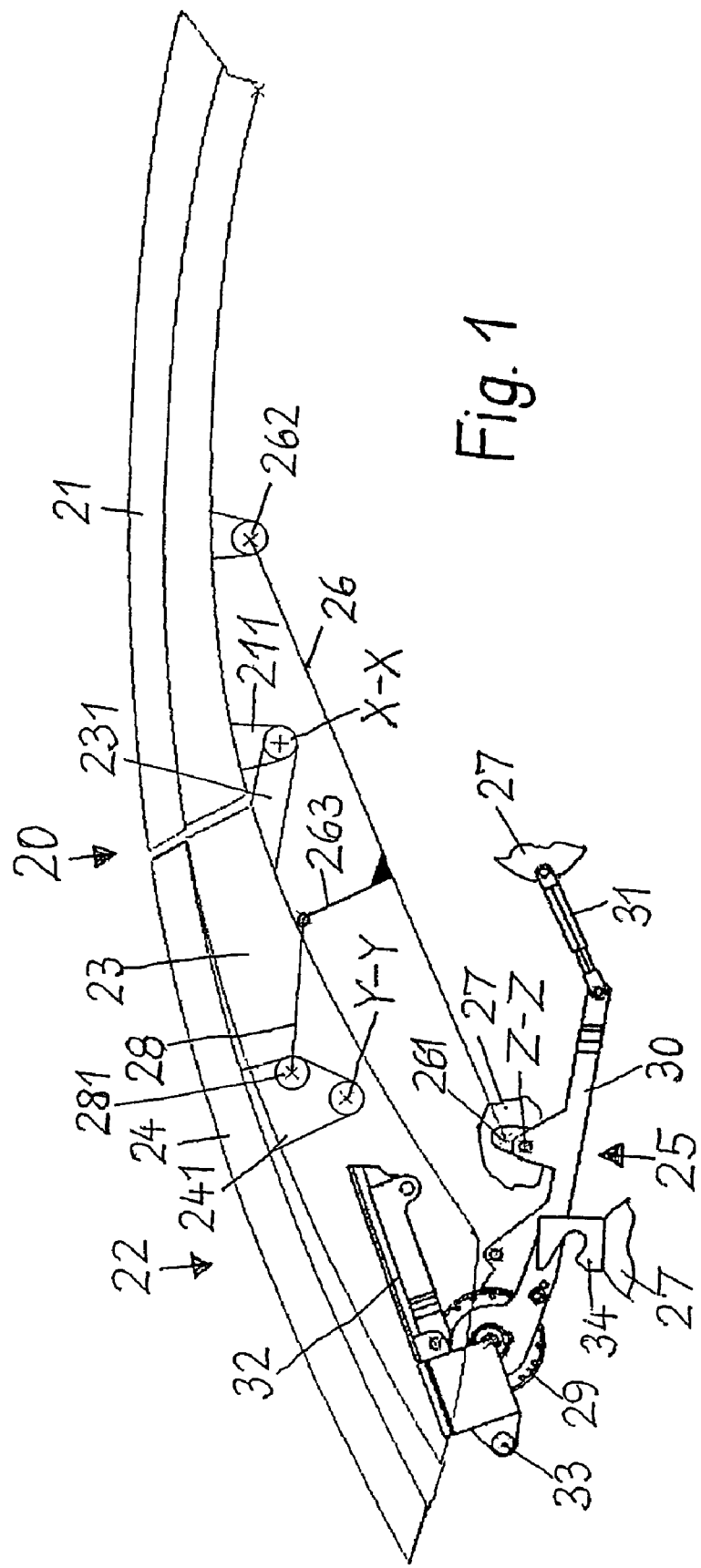
FIG. 1 illustrates the part of a convertible car according to the first inventive arrangement with the top being in locked position.

FIG. 1 shows the swivel parts of a convertible vehicle top 20, in particular a front part 21 and a rear part 22 that consists of a so called C-pillar 23 and a rear window 24. The front part 21 and the C-pillar 23 of the rear part 22 are connected with each other and have a common rotation axis X-X, which is in rectangular orientation to the plane of projection, towards which they perform different swiveling movements with swivel fixed pivot brackets 211, 231.

In the same way, the C-pillar 23 and the rear window 24 are connected with each other and can be differently swiveled around a common rotation axis Y-Y. Like the whole inventive arrangement 25, the rotation axes X-X and Y-Y being at least in an almost parallel position to each other are located at both sides of the vehicle that is shown only in this range and they can be moved in a defined manner mainly parallel to the plane of projection.

The part 21 is coupled to the body (the main bearing) 27 of the vehicle by means of a main connecting rod 26. A control rod 28 is coupled to the main connecting rod 26 in a defined manner via an extension arm 263 and forcibly generates the swiveling movement between the C-pillar 23 and the rear window 24 and thus puts down the rear window 24 in a parallel position to the front part 21; see FIG. 5. To ensure the forced swiveling movements, a clip 241 is mounted at the rear window 24. At said clip, which is used as a drag bearing, the control rod 28 is coupled in one point 281 in a fixed relation to the axis Y-Y.

A swivel motor 29 is used to initialize the swiveling movements of the parts 21, 23, 24 and is mounted at an intermediate bearing 30 that is carried at the body (main bearing) 27 in such a way that it can swivel around an axis Z-Z that is parallel to the axes X-X and Y-Y. The axis Z-Z is located near and below the coupling point 261 of the main connecting rod 26 at the intermediate bearing 30. The coupling point of the main connecting rod 26 at the front top part 21 is marked with 262. In an alternative design it is also possible to locate the coupling point 261 of the main connecting rod 26 at the body 27. In the arrangement shown in FIG. 1, the intermediate bearing 30 is designed as an articulated lever.

The drag motor 29 is mounted at one end of said lever and at its other end a flexibly actuated connection, for example of a spring, 31 is provided to the main bearing 27. An arm 32 at which the C-pillar 23 is mounted is rigidly linked to the casing of the motor 29 which can be rotated towards a fixed shaft To the other side of the arm 32 a guide pin 33 is flanged that interacts with a controlling stop (coupling jaw) 34 in defined movement positions described in the following.

In FIG. 1, the top 20 is in its locked position that is to be the initial position for these considerations. If the top is to be opened, the motor 29 is set into anticlockwise rotations; a maximum torque comes into effect.

Figure 2:
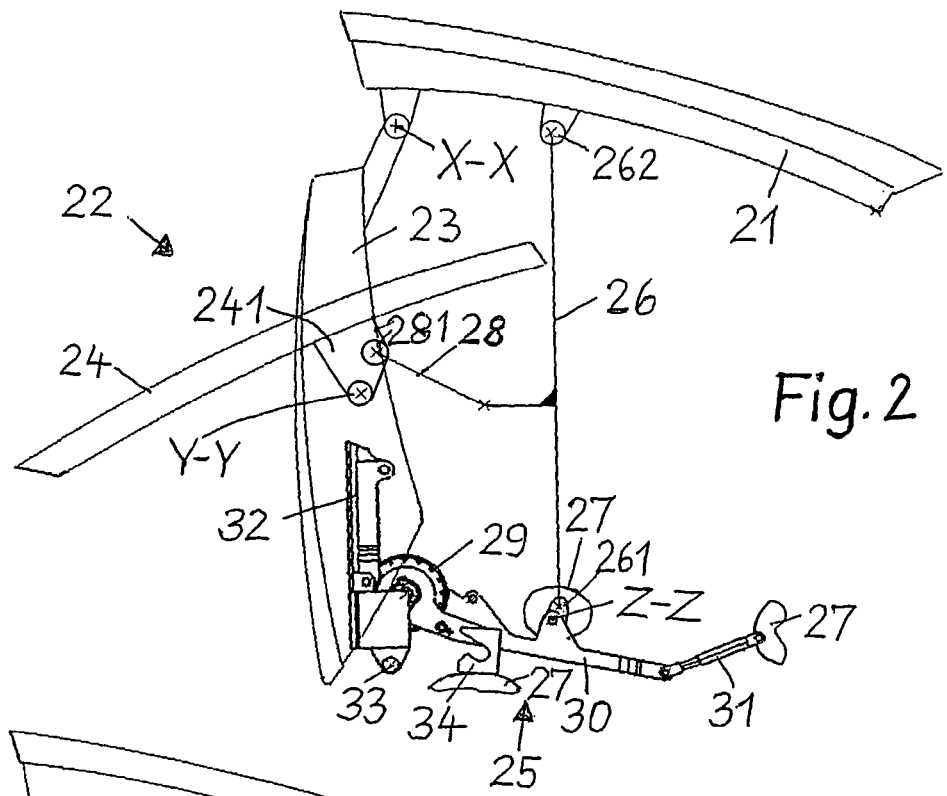
FIGS. 2-5 illustrate the different successive positions of the single parts of the inventive arrangement according to FIG. 1 up to the put-down position.

In FIG. 2, the top 20 is opened by about 50% and consequently 50% of the put-down position are reached. The part 21 is widely lifted by the main connecting rod 26, the rear window 24 has disengaged from the C-pillar 23, and both are turned against each other around the axis Y-Y, the C-pillar 23 and the main connecting rod 26 are in an almost vertical position. In this position, the top 20 has reached a balanced condition, the driving torque is zero. Due to the effective force of gravity the top 20 would fall into the put-down position now. But the drive 25 that consists of the motor 29, intermediate bearing 30 and spring 31 prevents this fall by a braking force (negative torque).

Figure 3:
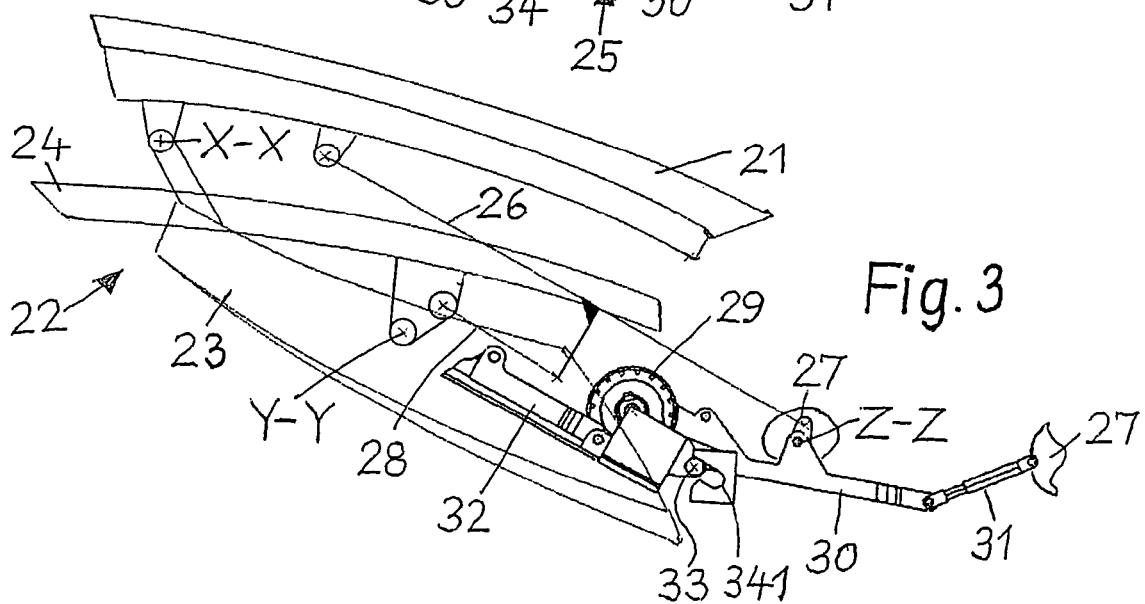

FIG. 3 shows a so called auxiliary loading position. The top part 21 has exceeded its maximum lifted position and is lowered to the back, viewed from the vehicle. Now, about 90% of the sequence of motions towards the put-down position are completed. The C-pillar 23 is distorted by almost 180° towards the rear window 24. The guide pin 33 fixed at the C-pillar 23 reaches the opening to the coulisse 341. For a further motion, the compressive force of the spring 31 must be overcome at the intermediate bearing 30. Thus, the drive 25 starts to stretch the spring 31 at the intermediate bearing 30.

Simultaneously with the kinematics of the top parts 21, 23, 24, the intermediate bearing 30 moves to the put-down position by swiveling around the axis Z-Z with the drag motor 29 as a result of the interaction of the guide pin 33 and the coulisse-like stop 34. In the further movement, the antitorque moment of the spring 31 at the intermediate bearing 30 is reduced due to the approximation to the dead center position.

Figure 4:
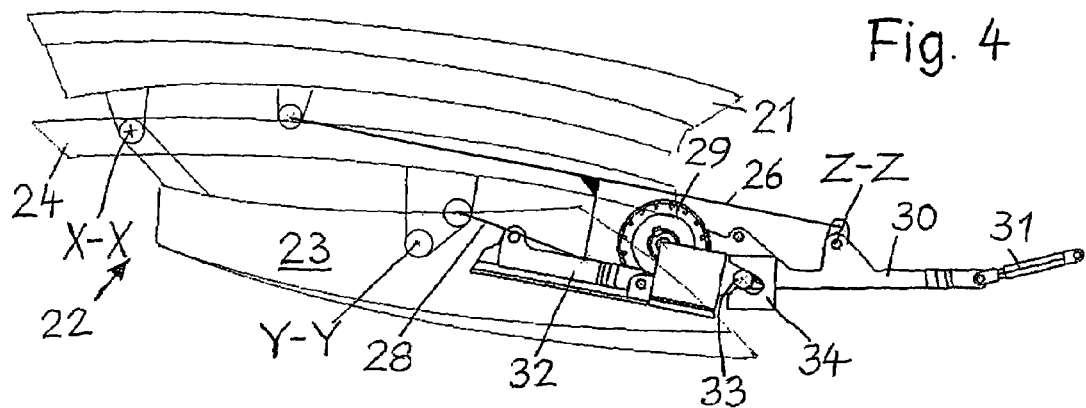

In FIG. 4, the top parts 21, 23, 24 have reached a balanced position with the load moment of the spring 31, the driving torque is zero. In the further motion, the top 21, 22 would fall into the put-down position now. But the drive 25 prevents this fall by braking forces and even exerts a negative torque.

Figure 5:
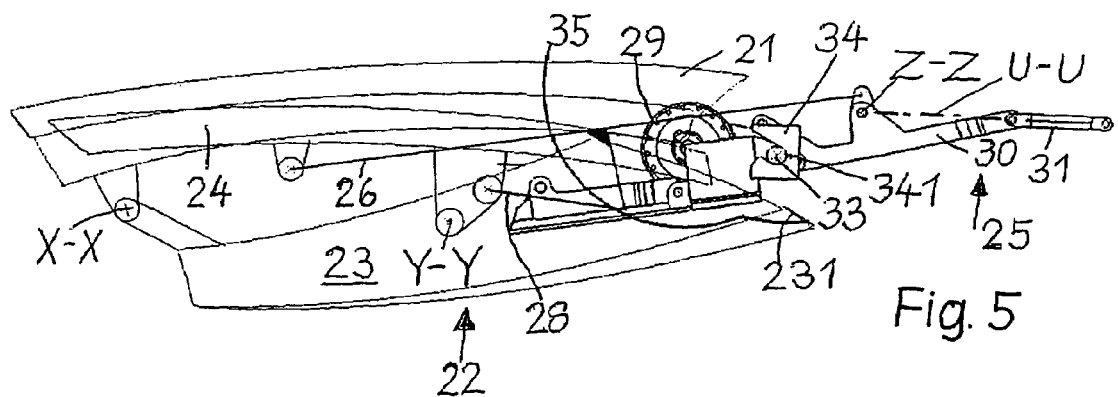

In FIG. 5, the top 21, 22 has reached the put-down position in which the single parts 21, 23, 24 of the top are compactly put down. The guide bolt 33 is inserted into the controlling stop 34 up to the end of the coulisse 34'. The geometric axis U-U of the spring 31 or its extension and the rotation axis Z-Z are not in a skew-whiff position to the other any longer but they intersect each other in one point. Now, the rear edge 23' of the C-pillar 23 has described a kinetic path 35. The drag motor 29 is switched off and thus the drive 25 is depressurized, the spring 31 at the intermediate bearing 30 cannot press the top 21, 22 upwards because of the exactly reached dead center position.

To bring the top 21, 22 again from the put-down position of FIG. 5 into the locked position of FIG. 1, the shown motions run in reverse order.

The following FIGS. 6 through 15 show the principal design and the motion sequence of two further arrangement examples that are equipped with differently mounted cylinder drives. For a simple and clear layout, the top parts are not shown and the arrangement is demonstrated in an enlarged projection.

In the FIGS. 6 through 10, an intermediate bearing 30 is again carried at a main bearing 27 in such a way that it can swivel parallel to the projection plane around an axis Z-Z that is arranged in a rectangular position to the projection plane. At one side of the axis Z-Z, a spring 31 fixed free to swivel at the body 27 is coupled in a point 302 to the intermediate bearing 30, which has the form of an articulated lever, and at the other side of the swivel axis Z-Z an arm 32 is fixed parallel to the intermediate bearing 30 in a point 301 at the intermediate bearing 30 to be able to swivel. The C-pillar (not shown) is rigidly mounted at said arm.

A drive cylinder 36 is fixed with one end 361 at the intermediate bearing (articulated lever) 30 between the axis Z-Z and the coupling point 302 of the spring 31 so that it can swivel mainly parallel to the projection plane. The extensible other end 362 of the drive cylinder 36 is pivoted with the arm 32 outside the center of motion 301. A guide pin 33 is again positioned at the other end of the arm 32 and interacts with a controlling coulisse 341 in the subsequent motion positions.

Figure 6:
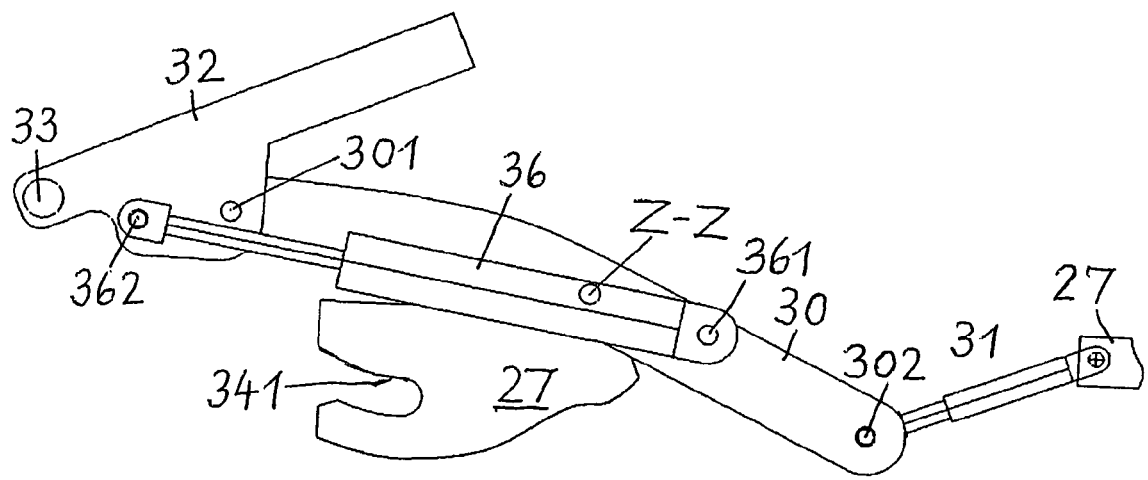
FIGS. 6-10 illustrates a second inventive arrangement in its positions corresponding to the FIGS. 1-5.
Figure 7:
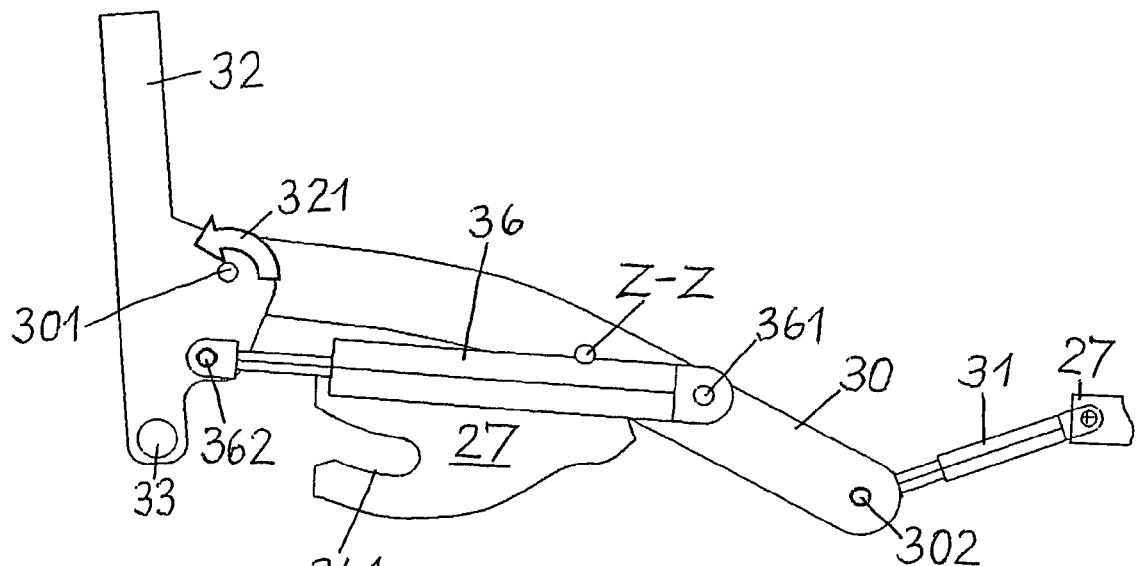

In the following, the sequence of motions is described analog to the FIG. 1-5 by means of the inventive arrangement and the unchanged cinematic relations existing between the moved top parts. Thus, FIG. 6 illustrates the arrangement for the locked position of the top that is not shown. In this position, the drive cylinder 36 is switched on; its motive force is at its maximum value and starts to open the top. FIG. 7 shows the arrangement after the completion of about 50% of the movement.

Figure 8:
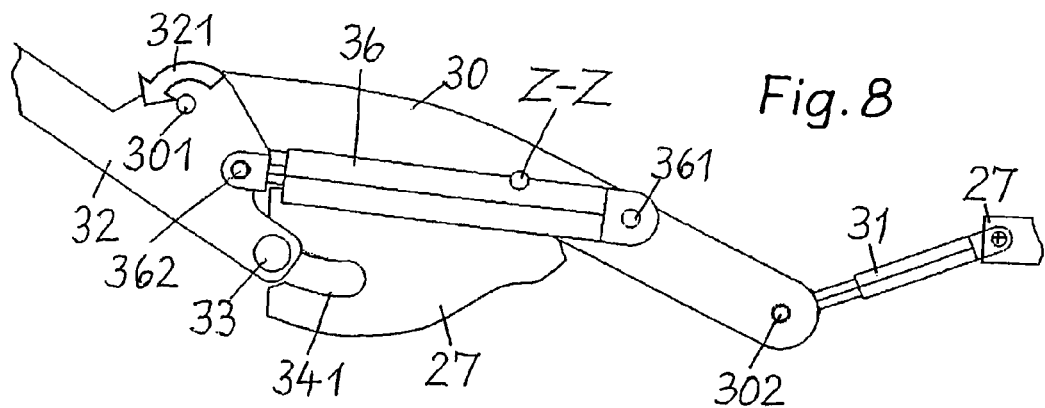

The arm 32 is erected (sketched out by an arrow 321) and reaches a balanced position in which the motive force goes to zero, and the drive holds the arm 32 and thus the top in this position by a (negative) holding force. During this process, the drive cylinder 36 swivels around its rotation point 361 at the intermediate bearing 30, downwards, towards the coulisse 341, without changing the position of the intermediate bearing 30. During the following effect of the drive cylinder 36, the arm 32 is further swiveled around its rotation point 301 towards the arrow 321 in such a way that the pin 33 moves to the opening of the coulisse 341, as shown in FIG. 8. Now, 90% of the sequence of motions are completed.

Figure 9:
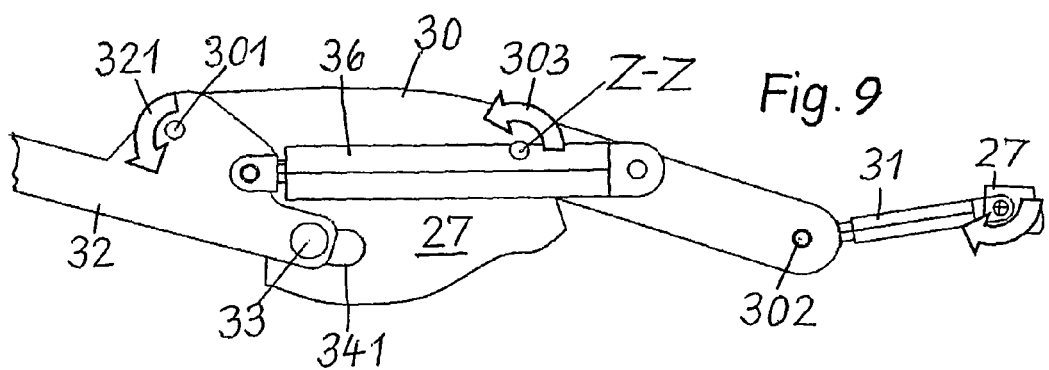

In the further continuously running motion of the top initialized by the drive cylinder 36, the pin 33 slides in the coulisse 341 to the right end of the latter, as shown in FIG. 9. This action swivels the intermediate bearing 30 around the body-mounted axis Z-Z towards an arrow 303 and the spring 31 coupled to the intermediate bearing 30 in point 302 is tensioned so that in the course of motions its antitorque moment caused by the approach to the dead center position must be overcome. A balanced position is now reached again beyond of which the counterforce of the drive cylinder 36 prevents the free fall of the arm 32 and thus of the top not shown.

Figure 10:
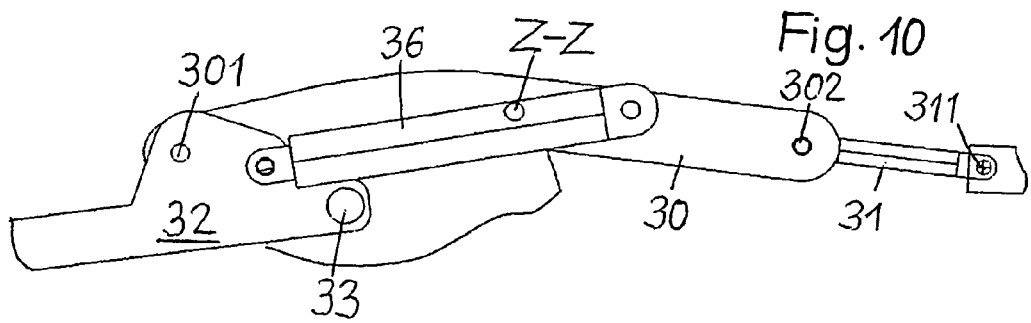

In FIG. 10, the put-down position is reached; 100% of the sequence of motions are completed. The guide pin 33 has arrived at the stop end of the coulisse 341 that is covered by the arm 32. The coupling points 311, 302 and the axis Z-Z are in a rectangular position to the projection plane or their projections into the projection plane are located on a straight line. The drive cylinder 36 and consequently the entire drive can be switched without pressure because the spring 31 that is maximally compressed is in the dead center position and cannot leave it without the action of the drive cylinder 36. For the rest, the explanations given to the FIGS. 1-5 are applicable.

The FIGS. 11 through 15 show again an intermediate bearing 30 that can be swiveled around an axis Z-Z parallel to the projection plane as well as a coulisse 341 rigidly mounted to the body 27 and a spring 31 that is carried at the body 27 in such a way that it can be swiveled parallel to the projection plane. A swivel axis V-V for a drive cylinder 36 that can be swiveled in a plane rectangular to the projection plane goes through the coupling point 302 of the spring 31 to the intermediate bearing 30 and said axis is in rectangular position to the projection plane. Opposite to the coupling point 302 relative to the rotation axis Z-Z, a coupling point 301 is located on the intermediate bearing 30 for an arm 32 that is connected with the not shown C-pillar and provided with a guide pin 33.

Moreover, an actually known intermediate gear consisting of connecting rods 37, 38, 39, 40 is arranged near the coupling point 301 and all its rods can swivel in planes parallel to the projection plane. One end of the rod 37 is carried at the intermediate bearing 30 between the coupling point 301 and the axis Z-Z in a point 371 and at the other end it is coupled to the drive cylinder end 362. To the latter coupling point 362 one end of the cranked rod 38 is also coupled 362 whereas its other end is pivoted with the rod 39 in a point 381. At its other end the rod 39 is coupled to a clip 322 at the arm 32 in a point 391.

The rotation point 301 to the intermediate bearing 30 is also located at said clip 322. Finally, one end of the rod 40 is pivoted with the arm 32 and the other end with the rod 38. The hinge point 401 of the rod 40 at the arm 32 is located almost on a straight line with the points 391 and 301. The rod 40 is connected to the rod 38 approximately in the middle in a point 402 that is located mainly on a straight line with the points 362 and 381.

Figure 11:
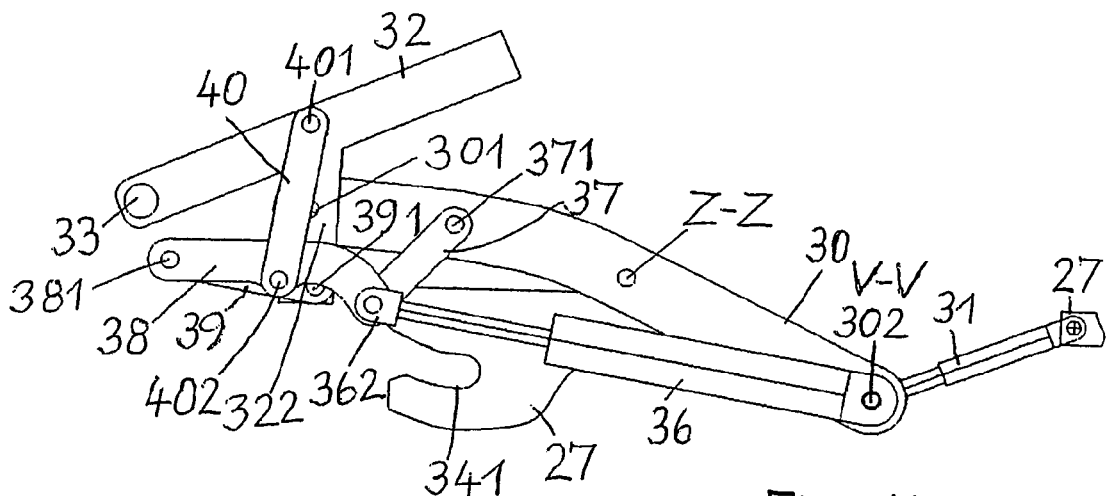
FIGS. 11-15 illustrates a third inventive arrangement in its positions corresponding to the FIGS. 6-10.
Figure 12:
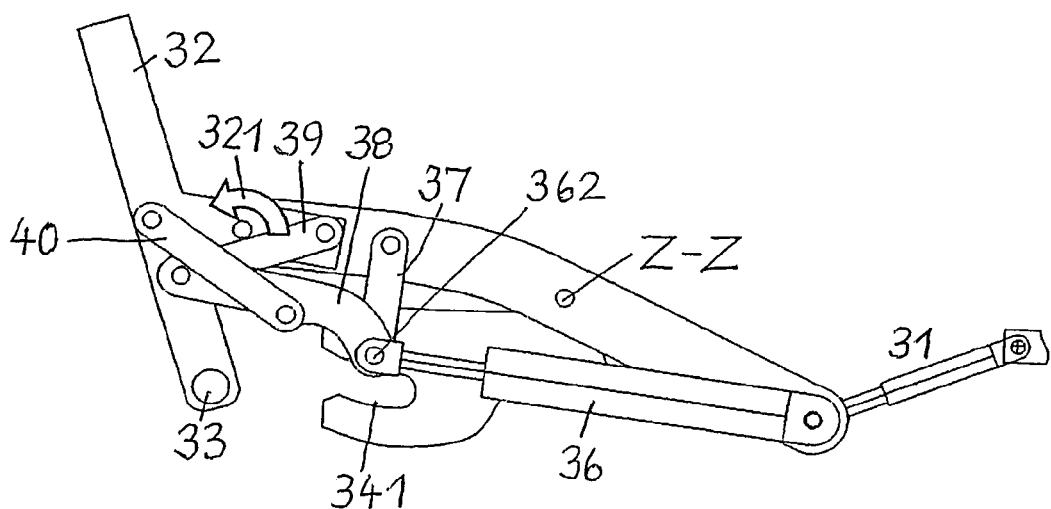

In FIG. 11, the gear arrangement driving and controlling the movable top parts (FIG. 1) is shown in the locked position. The movement is started towards the put-down position by switching on the drive cylinder 36; the motive force is at its maximum value. In FIG. 12, the drive cylinder 36 has drawn the rotation point 362 by about 50% towards itself and thus it has erected the arm 32 with the not shown C-pillar towards an arrow 321 via the intermediate gear rods 37 through 40.

Figure 13:
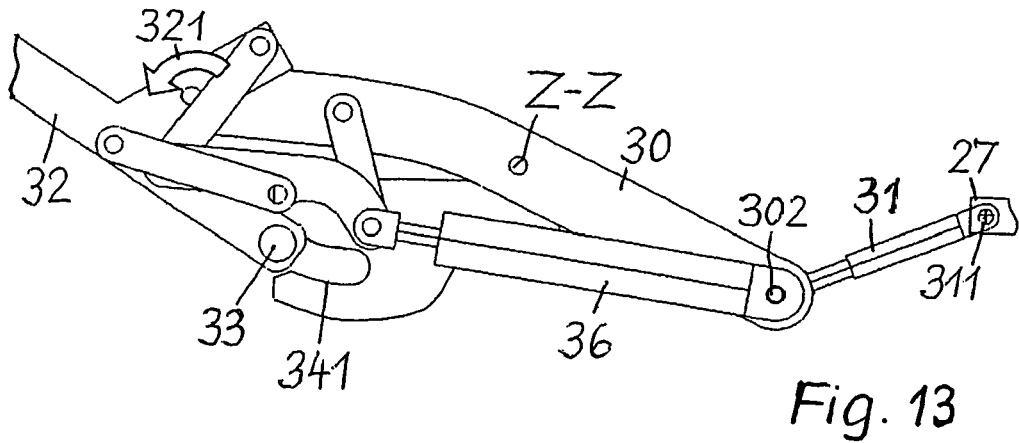

The movable top parts reach a balanced position in which the motive force is zero. After this balanced condition, the top parts would fall into the put-down position, if they were not broken by the negative holding force of the drive cylinder 36 starting to be effective just from that moment. FIG. 13 shows the point in time (at 90%) in the motion sequence of the drive arrangement at which the guide pin 33 reaches the opening to the coulisse 341 by the swivel motion of the arm 32 towards the direction that is indicated by an arrow 321. From this moment, the straining force of the spring 31 acting on the coupling point 302 of the intermediate bearing 30 must be overcome.

Figure 14:
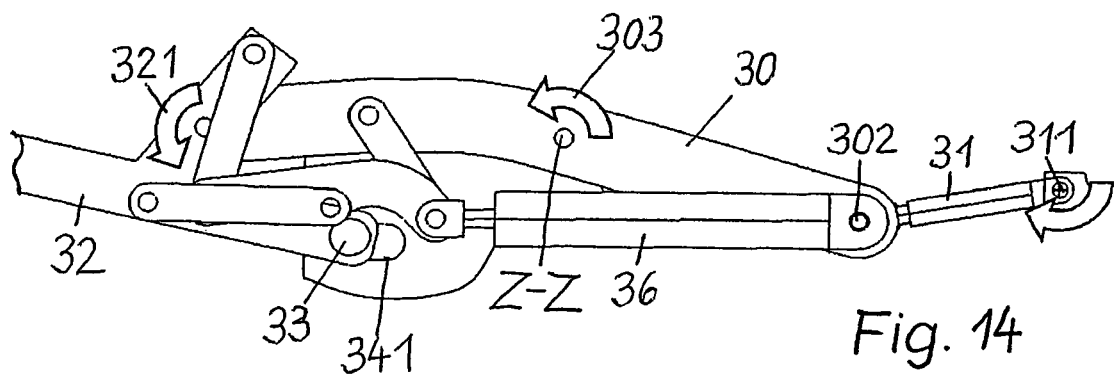

The intermediate bearing 30 starts to swivel towards an arrow 303 (FIG. 14). During this swivel motion, the load moment of the spring 31 at the intermediate bearing 30 is reduced by approaching the dead center position in which the points 311 and 302 as well as the projection of the axis Z-Z into the projection plane are located on a straight line.

Figure 15:
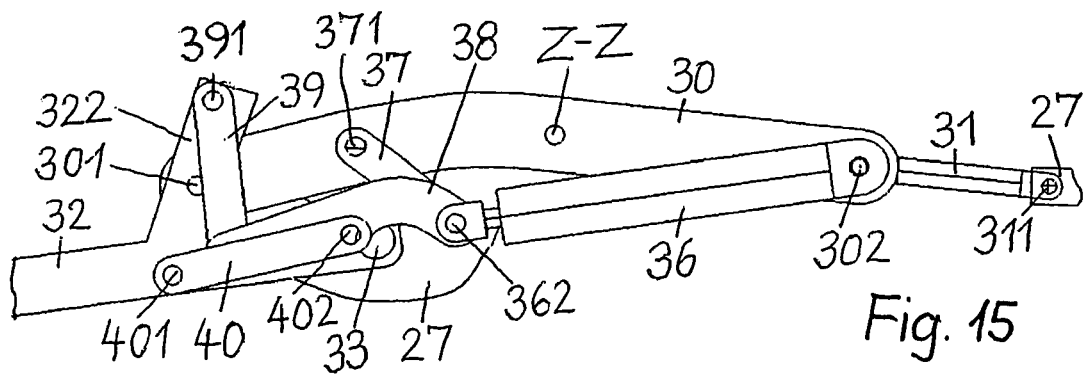

In FIG. 14, the top parts reach a balanced condition with the load moment of the spring 31; the motive force becomes zero. The drive arrangement acts against the fall of the top parts. In FIG. 15 the put-down position is reached. The drive cylinder 36 can be switched off and the spring 31 cannot set the intermediate bearing 30 into motion, because both are in the dead center point. In summary it is to be said that the swivel motion of the rod 37 by about 90°, which is generated by the drive cylinder 36, is transmitted by the intermediate gear with the rods 38, 39, 40 into a swivel motion of the arm 32 by about 150° around the point 301 into the put-down position.

Figure 16:
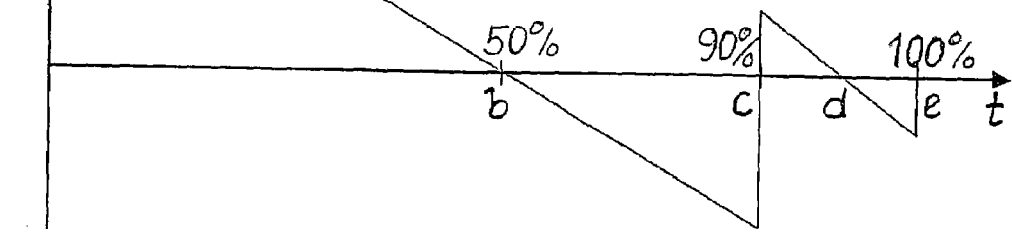
FIG. 16 is a diagram showing the sequence of motions of the arrangements just mentioned.

The graph in FIG. 16 shows the torques M or the forces F during the time t. This figure demonstrates that—correspondingly to the explanations given for the FIGS. 1 through 15—the torque/force has reached its maximum value in time a when the motion starts and becomes zero till time b when 50% of the sequence of motions are completed. Afterwards, up to the point in time c, after the completion of 90% of the sequence of motions, a load moment, a holding force is developed.

At the point in time c, the added flexibly actuated connection leads to a positive moment/a positive force that is smaller than at the beginning of the sequence of motions. As a result of the approach to the dead center point these moments/forces become zero at the point in time d and have only the effect of a holding moment or holding force until the drive is switched off in the dead center point at the point in time e after the completion of 100% of the sequence of motions.

All elements presented in the description, the claims and the drawing can be decisive for the invention both as single elements and in any combination.

The invention claimed is:

1. Arrangement for swiveling the parts of a convertible vehicle top, which consists at least of two cinematically connected parts, between a locked position and a put-down position, wherein an intermediate bearing is carried at the body of the vehicle in such a way that it can swivel, and one end of said intermediate bearing is coupled to the body via a flexibly actuated connection element and at its other end it is coupled to one of the swiveling parts of the convertible top, a drive unit provided at the intermediate bearing for swiveling the parts of the convertible top and a body-mounted control stop for a stop element that is fixed at the swiveling part of the top of the vehicle being coupled to the intermediate bearing.

2. Arrangement according to claim 1, wherein the intermediate bearing is an articulated lever.

3. Arrangement according to claim 1, wherein the drive unit is a swivel motor.

4. Arrangement according to claim 3, wherein the turntable part of the swivel motor is connected with the swiveling part of the convertible top which is coupled to the swiveling intermediate bearing.

5. Arrangement according to claim 1, wherein the drive unit is a drive cylinder.

6. Arrangement according to claim 5, wherein the drive cylinder is mounted at one end at the intermediate bearing between the body-mounted drag bearing of the intermediate bearing and the coupling point of the flexibly actuated connection unit at the intermediate bearing in such a way that it can be swiveled and at its other end it is connected with the swiveling part of the convertible top that is coupled to the intermediate bearing, and said coupling is provided between the coupling point and the stop element.

7. Arrangement according to claim 5, wherein the drive cylinder is fixed at one side to the coupling point of the flexibly actuated connection element at the intermediate bearing and at the other side it is coupled via intermediate gear rods to the swiveling part of the convertible top that is coupled to the intermediate bearing.

8. Arrangement according to claim 7, wherein the connection point of the drive cylinder to the swiveling part of the convertible top is arranged near its coupling location at the intermediate bearing.

9. Arrangement according to claim 1, wherein the flexibly actuated connection element is designed as a compression spring.

10. Arrangement according to claim 5, wherein the drive cylinder is fixed at one side to intermediate bearing and at its other side via intermediate gear rods to the swiveling part of the convertible top that is coupled to the intermediate bearing.

* * * * *